Patented May 6, 1952

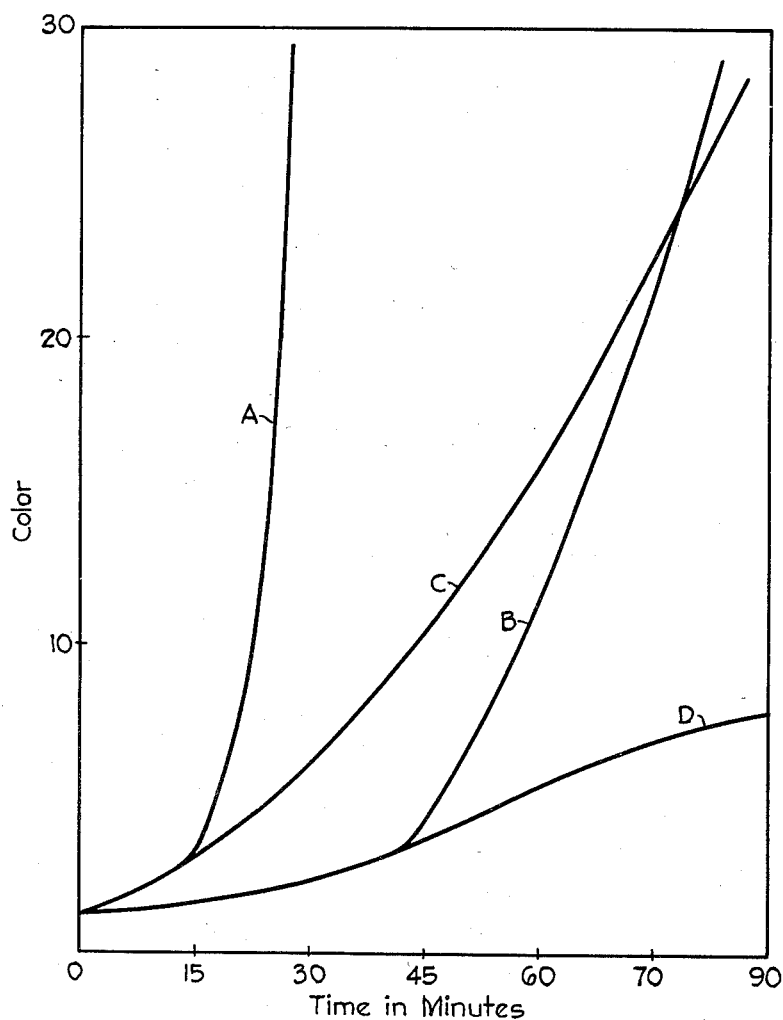

2,595,619

UNITED STATES PATENT OFFICE 2,595,619

USE OF A MIXTURE OF A DIAMIDE OF A CARBONIC ACID AND AN EPOXY COMPOUND TO STABILIZE A HALOGEN CONTAINING MATERIAL

Heino Tonnis Voorthuis, Amsterdam, Netherlands, assignor to Shell Development Company, San Francisco, Calif., a corporation of Delaware Application February 23, 1949, Serial No. 77,706
In the Netherlands March 4, 1948

15 Claims. (Cl. 260—45.8)

This invention relate to the stabilization of high molecular weight organic materials containing inorganic acid-forming elements. More particularly the invention relates to a novel process for stabilizing high molecular weight organic materials containing inorganic acid-forming elements against decomposition caused by heat and light, and to the heat and light stable compositions produced thereby.

Specifically, the invention provides an efficient method for stabilizing high molecular weight organic materials containing inorganic acid-forming elements against the effects of light and heat which comprises incorporating with the said materials a member of the group consisting of the diamide of carbonic acid, the diamides of acids derived from carbonic acid by the substitution of the central oxygen atom, and derivatives of the foregoing diamides, and in combination therewith an epoxy-containing organic material. The invention further provides heat and light stable compositions comprising the high molecular weight organic materials containing inorganic acid-forming elements and the above-described combination of additives.

High molecular weight organic materials containing acid-forming elements, such as halogen atoms, sulfate, phosphate and nitrate radicals, are becoming increasingly important in industry. The high molecular weight halogen-containing polymers, for example, find application in the production of coating compositions, fibers, films, and in the production of shaped articles by various molding techniques. The industrial use of these materials is considerably limited, however, by their tendency to decompose, particularly in the presence of heat and light, to liberate acid decomposition products. As a result of this decomposition the products become discolored and in many instances, lose many of their more desirable mechanical properties. In addition, the acid products formed during the decomposition have a deleterious effect on the metal parts of the fabrication equipment and any metal parts that might be embedded in the finished article.

The decomposition problem is particularly serious in the case of the halogen-containing polymers, such as polyvinyl chloride, which are usually required to be milled and molded at relatively high temperatures, e. g. temperatures in the vicinity of 200° C. When heated at these temperatures the polymers frequently develop strong yellow or brown colors and lose a greater part of the flexibility and strength.

It has been proposed to stabilize the high molecular weight organic materials against this type of decomposition by the addition thereto of various inorganic or organic compounds, but the results obtained heretofore have not been entirely satisfactory. In most cases the additive employed has brought about only a temporary stabilization effect and after a short period of exposure to heat and light the material still becomes discolored, etc. It has been proposed, for example, to employ as stabilizers thiourea derivatives alone or in combination with sodium carbonate but it has been found that the addition of these materials only inhibit the discoloration for a few minutes and thereafter the material is rapidly discolored.

It is, therefore, an object of the invention to provide a method for increasing the stability of high molecular weight material containing acid-forming elements toward heat and light. It is a further object to provide a method for increasing the stability of the above-described material towards discoloration and decline of mechanical properties caused by the action of heat and light. It is a further object to provide compositions of high molecular weight material containing acid-forming elements which possess an increased stability toward heat and light. It is a further object to provide stabilized compositions of the above-described materials which can withstand long periods of exposure to light and heat without undergoing substantial discoloration or loss of physical properties. Other objects and advantages of the invention will be apparent from the detailed description given hereinafter.

It has now been discovered that the high molecular weight organic materials containing inorganic acid-forming elements may be stabilized against the effects of heat and light for unexpectedly long periods of time by incorporating with the said materials a member of the group consisting of the diamide of carbonic acid, diamides of acids derived from carbonic acid by the substitution of the central oxygen atom, and derivatives of the foregoing diamides, and in combination therewith an epoxy-containing organic material.

Some of the compounds employed as stabilizers in the process of the invention when utilized by themselves exert a favorable influence on the stabilization of the high molecular weight organic material containing the acid-forming elements. However, the stabilizing action obtained by the use of these compounds in combination in the various ratios described hereinafter exceeds that of the individual stabilizers to a far greater extent than could have been expected. Evidence of the unexpected superiority of the above-described combination of stabilizers over the individual agents themselves may be found in the examples below.

The material to be stabilized by the process of the invention may be any high molecular weight organic material containing acid-forming elements. By acid-forming elements is meant any atom or group of atoms, such as halogens, the sulfate, phosphate and nitrate radicals, which on release are capable of forming acids or acid-acting compounds. Illustrative examples of such materials are the halogenated products of fats, train oils, waxes, polymers of halogenated monomers, polymers of the monomers containing sulfate, nitrate and phosphate radicals, after-halogenated polymers of the various monomers, halogenated rubber, polymers and copolymers of dienes with sulfur dioxide, nitrogen trioxide, and the like.

The preferred group of high molecular weight organic materials to be stabilized by the process of the invention are the halogen-containing polymeric material. This group includes the polymers obtained from the halogen-containing monomers and the product obtained by halogenating already formed natural or synthetic polymers. Examples of this preferred group of materials are the polymers, copolymers and interpolymers of the halogenated dienes, such as 2-chloro-butadiene - 1,3, 3 - bromo - butadiene-1,3, 2-chloro-3-methylpentadiene-1,4, the halogenated monoolefins, such as vinylchloride, vinylidene chloride, vinyl fluoride, tetrafluoroethylene, chlorofluoroethylene, methyl chloroacrylate, vinyl chloroacetate, bromostyrene, chloroacrylonitrile, diallyl chlorophthalate, dichlorophthalate, dichloroallyl chloroterphthalate, copolymers and interpolymers of the above-described halogen-containing monomers with other type polymerizable compounds, such as vinyl acetate, methyl methacrylate, methacrylonitrile, acrylonitrile, styrene, ethylene, butadiene, diallyl phthalate, allyl alcohol, vinyl propionate, and diallyl ether, the after-halogenated polymers, copolymers and interpolymers described above, such as after-chlorinated polyvinyl chloride, after - chlorinated polyvinylidene chloride, after-brominated polyvinyl chloride, after-chlorinated polytetrafluoroethylene, after-chlorinated copolymer of chloroacrylonitrile and vinyl acetate, and the like.

A particularly preferred group of high molecular weight organic material to be stabilized by the process of the invention are the polymers of the chlorine substituted ethenoid monomers. The expression "ethenoid monomers" refer to those monomers containing at least one >C=C< group in their molecule. Examples of this preferred group are polyvinyl chloride, polyvinylidene chloride, copolymers of vinyl chloride and vinyl acetate, copolymers of chloroallyl acetate and methyl methacrylate, polyallyl chloride, polymethallyl chloride, interpolymers of vinyl chloride, vinyl acetate and methyl methacrylate, polytetrachloroethylene, copolymers of polytetrachloroethylene and vinyl propionate, and the like.

The polymers to be stabilized by the process of the invention may be prepared by any suitable method. They may be prepared, for example, by polymerization in bulk, solvent solution, or aqueous emulsion or suspension systems. The polymers are preferably prepared, however, by polymerization in an aqueous emulsion. The preferred aqueous emulsion polymerization process comprises adding the material to be polymerized to a mixture containing water, emulsifying agent, polymerization catalyst, and pH adjuster, emulsifying the mixture and subjecting it to the desired temperature and pressure, and subsequently coagulating the resulting polymer latex.

Suitable emulsifying agents that may be employed comprise the soaps, such as sodium and potassium myristate, laurate, palmitate and stearate; the alkali metal alkyl or alkylene sulfates, such as sodium lauryl sulfate; the alkali metal alkyl, alkylene or alkylaryl sulfonates, as sodium lauryl sulfonate; sulfonated mineral oil, and the like. The amount of the emulsifying agent utilized will vary over a considerable range depending upon the various conditions but in most cases will vary between 0.1% to 6% by weight of the monomer.

Examples of polymerization catalyst that may be employed comprise the per-acids, such as persulfuric acid, peracetic acid, and perphthalic acid, the per-salts, such as potassium persulfate, the peroxide catalysts, such as hydrogen peroxide, benzoyl peroxide, succinyl peroxide, and the like. The amount of the catalyst employed will usually vary between about .01% to 5% by weight of monomer.

Suitable pH adjusters include such substances as trisodium phosphate, sodium carbonate, sodium bicarbonate, disodium hydrogen phosphate and calcium carbonate.

Temperatures employed in the preferred aqueous emulsion process will usually vary between about 20° C. to 80° C. Higher or lower temperatures may be employed, however, if desired or necessary. The polymerization may be conducted under atmospheric, superatmospheric or subatmospheric pressures.

The polymer formed in the aqueous emulsion will usually appear as a latex which may readily be coagulated by the addition of electrolytes, solvents, and the like.

The first set of stabilizing agents to be employed in the process of the invention are the members of the group consisting of the diamide of carbonic acid, the diamides of acids derived from carbonic acid by the replacement of the central oxygen atom with elements or radicals, such as an atom of sulfur, the imide radical, etc., and the derivatives of the foregoing amides obtained by replacing at least one of the hydrogen atoms attached to the amino nitrogen atoms with organic radicals. Preferred organic radicals to be attached to the amino nitrogen atoms are the hydrocarbon radicals, such as methyl, ethyl, allyl, methallyl, 3-butenyl, 2,5-hexidienyl, butyl, octyl, isobutyl, decyl, cyclohexyl, cyclopentyl, phenyl, tolyl, naphthyl, xylyl, 2-isopropylbenzyl, mesitylyl, and the like. Examples of this group of stabilizing agents are urea, thiourea, tetraethyl urea, phenyl urea, diphenyl urea, allyl thiourea, methallyl thiourea, dichlorodiphenyl thiourea, phenyl guanidine, dibutyl guanidine, ditolyl urea, dixylyl thiourea, dinaphethyl urea, and diallyl guanidine.

Particularly preferred diamides to be employed in the process of the invention are the members of the group consisting of urea, thiourea, guanidine, and derivatives of each of the foregoing members wherein at least one of the hydrogen atoms attached to the amino nitrogen atoms has been replaced by an aromatic radical, preferably containing from 6 to 15 carbon atoms. Examples of the diamide derivatives are phenyl thiourea, diphenylurea, ditolyl urea, diphenyl guanidine, ditolyl guanidine, and dixylyl urea.

The additives to be employed in combination with the above-described diamides or diamide derivatives are the epoxy-containing organic materials. The expression "epoxy-containing organic material" as employed throughout the specification and claims is meant to include all those organic materials containing at least one

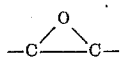

group, i. e. a group containing two aliphatic carbon atoms joined together through a single bond and joined to the same oxygen atom through separate ether linkages. The materials may be monomeric or polymeric and may be saturated, unsaturated, aliphatic aromatic, or alicyclic. The materials may also be substituted if desired with non-interfering substituents, such as the hydroxyl group, halogen atoms, and the like.

Examples of epoxy-containing organic material are epoxypropane, 1 - hydroxy - 2,3 - epoxypropane, 1-chloro-2,3-epoxypropane, 1,2-epoxybutane, 2,3-epoxybutane, 4 - chloro - 1,2 - epoxypentane, alloxy - 2,3 - epoxypropane, dodecoxy-2,3-epoxypropane, 1,2-epoxyhexene-1, phenoxy-2,3-epoxypropane, 1,6-dichloro-2,3-epoxyhexane, butenoxy - 2,3 - epoxypropane, naphthoxy - 2,3-epoxypentane, 1,4 - bis(2,3 - epoxypropoxy) benzene, 1,3 - bis(2,3 - epoxypropoxy)benzene, 1,3-bis(3,4-epoxybutoxy)benzene, glycidyl stearate, glycidyl caproate, 1,3,5 - tris(3,4 - epoxybutoxy) - benzene, 1,3-bis(2,3-epoxybutoxy) -5-(2,3-epoxypropoxy)benzene, 2,5,7 -tris(2,3- epoxypropoxy) - benzene, 4,4' - bis(2,3 - epoxypropoxy)diphenyl ether, 1,3 - bis(3,4 - epoxypentoxy)benzene, 1,8-bis(2,3-epoxypropoxy)octane, 1,4-bis(2,3-epoxypropoxy)cyclohexane, 1,3-bis(2,3-epoxybutoxy) - cyclopentane, 4,4' - bis(2,3 - epoxypropoxy) di-phenyldimethylmethane, 4,4'-bis(2-hydroxy-3,4-epoxybutoxy)diphenyldimethylmethane, 1,3-bis-(2,3-epoxypentoxy) -5-chlorobenzene, 1,3-bis(2,3-epoxybutoxy) - 5 - bromobenzene, 1,3 - bis(2,3-epoxypropoxy)5,6 - dichlorooctane, 1,4 - bis(2,3-epoxybutoxy) 2-chlorocyclohexane, 1,4-bis(2,3-epoxypropoxy) - 2 - cyclohexene, 1,4 - bis(2,3-epoxypentenoxy) - 3 - bromocyclopentane, the polyepoxy polyhydroxy polyethers obtained by reacting a polyhydroxyl alcohol with a polyepoxide, such as 1,3-bis(2-hydroxy-3,4-epoxybutoxy)benzene, 1,4-bis(2-hydroxy-4,5-epoxypentoxy)benzene, 1,3 - bis(2 - hydroxy - 3,4-epoxybutoxy)propane, 1,2,3 - tri(2 - hydroxy-3,4 - epoxypentoxy)propane, 1,2,3,4 - tetra(2-hydroxy-3,4-epoxybutoxy)butane, the reaction product of 1 mole of glycerol and 3 moles of bis(2,3-epoxypropyl) ether, the reaction product of sorbitol and 6 moles of bis(2,3-epoxy-2-methylpropyl) ether, and the reaction product of 1 mole of pentaerythritol and 5 moles of 1,2-epoxy-4,5-epoxypentane.

Further examples are the polymeric epoxides formed by reacting a polyhydric alcohol with a sufficient excess of a polyepoxide or a halogen-containing epoxide, preferable in the presence of an alkaline catalyst. Examples of such polyhydric alcohols are resoricinol, catechol, bisphenol (2,2' - di - p - phenylpropane), 4,4 - dihydroxydiphenylmethane, bis(2,2' - dihydroxy-dinaphthyl)methane, the polyhydroxy naphthenes, propylene glycol, trimethylene glycol, butylene glycol, glycerol, sorbitol, mannitol pentaerythritol, and the ethylenically unsaturated or the halogen-containing polyhydric derivatives of any of the above-types of polyhydric alcohols. The polyepoxides may be exemplified by 1,2 - epoxy - 3,4 - epoxybutane, 1,2 - epoxy-4,5 - epoxypentane, bis(2,3 - epoxypropyl) ether, bis(2,3 - epoxybutyl) ether, bis(2,3 - epoxy - 2-methylpropyl) ether. The halogen-containing epoxides are exemplified by epichlorohydrin, 3-chloro - 1,2 - epoxybutane, 3-bromo - 1,2 - epoxyhexane, 3-chloro-1,2-epoxyoctane, and the like. Polymers of this type have structures analogous to that illustrated below for the particular case of the reaction between bisphenol and epichlorohydrin,

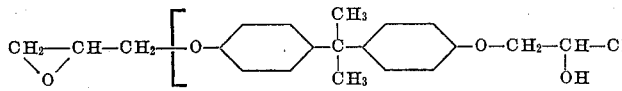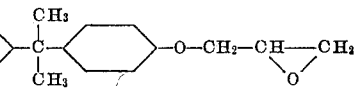

where $n$ represents an integer greater than one.

Other examples of this group of materials are the polymers and copolymers of the epoxy-containing monomers possessing at least one polymerizable aliphatic carbon-to-carbon multiple bond, such as an ethylenic group $>C=C<$. When this type of monomer is polymerized in the substantial absence of alkaline or acidic catalysts, such as in the presence of heat, oxygen, peroxy compounds, actinic light, and the like, they undergo addition polymerization at the multiple bond leaving the epoxy group unaffected. These monomers may polymerize with themselves or with other ethenoid monomers, particularly the vinyl-type monomers, i. e. these containing at least one $CH_2=C<$ group, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate.

Illustrative examples of these polymers and copolymers containing the epoxy groups are poly(allyl 2,3 - epoxypropyl ether); poly(2,3-epoxypropyl crotonate); allyl 2,3-epoxypropyl ether-styrene copolymer; methallyl 3,4-epoxybutyl ether-allyl benzoate copolymer; poly(4,5-epoxypentyl crotonate); poly(4,5-epoxypentyl acrylate); poly(2,3-epoxypropyl cyclohexenoate); poly(vinyl 2,3-epoxypropyl ether); allyl glycidyl ether-vinyl acetate copolymer; poly(methallyl 2,3-epoxypropyl ether); poly(allyl 1-methyl-2,3-epoxypropyl ether); poly(4 - glycidyloxy - sty-rene); poly(1-vinyl-2-pentadecyl glycidyl ether); and poly(tiglyl 3,4-epoxybutyl ether).

The preferred group of epoxy-containing organic materials to be employed in the process of the invention are those organic materials containing a plurality of epoxy-substituted organic radicals which are joined to other organic radicals through ether linkages. Examples of this preferred group of compounds are 1,4-bis(2,3-epoxypropoxy)benzene, 1,3-bis(2,3-epoxypropoxy)benzene, 1,3-bis(3,4-epoxybutoxy)benzene, 1,4-bis(2,3 - epoxypropoxy)cyclohexane, 4,4'-bis (2,3-epoxypropoxy) di-phenyl - dimethylmethane, 1,3-bis(2,3-epoxypentoxy) 5-chlorobenzene, 1,3-bis(2-hydroxy-3,4 - epoxybutoxy)benzene, 1,2,3-tri-(2-hydroxy - 3,4-epoxypentoxy)propane, the polymer obtained by reacting resorcinol with an excess of epichlorohydrin, polymer prepared by reacting bisphenol with an excess of bis(2,3-epoxypropyl) ether, the polymer prepared by reacting sorbitol with an excess of bis(2,3-epoxypropyl) ether, poly(allyl-2,3-epoxypropyl ether), poly(2,3-epoxypropyl crotonate), and the like.

A particularly preferred group of epoxy-containing organic materials to be employed in the process of the invention are the members of the group consisting of the organic compounds possessing a plurality of epoxyalkoxy radicals, preferably 2 to 4, joined to an organic radical which contains from one to two aromatic rings, organic compounds possessing a plurality of epoxyhydroxyalkoxy radicals, preferably 2 to 4, joined to an organic radical containing from one to two aromatic rings, the polyepoxy-containing polymeric reaction product of an aromatic polyhydric alcohol and epihalohydrin, the polyepoxy-containing polymeric reaction product of an aliphatic polyhydric alcohol and epihalohydrin, the polyepoxy-containing polymeric reaction product of an aromatic polyhydric alcohol and a polyepoxide compound, the polyepoxy-containing polymeric reaction product of an aliphatic polyhydric alcohol and a polyepoxide compound, the polymers of the epoxy-containing monomers possessing at least one polymerizable aliphatic carbon-to-carbon multiple bond prepared in the absence of alkaline or acidic catalysts, and copolymers of the foregoing epoxy-containing monomers and a monomer containing at least one $CH_2=C<$ prepared in the absence of alkaline or acidic catalyst. The expression "epoxy-alkoxy radical" refers to an alkoxy radical substituted with an epoxy group. The expression "epoxyhydroxyalkoxy radical" refers to an alkoxy radical substituted with a hydroxyl group and an epoxy group. Illustrative examples of this particularly preferred group of compounds are 1,4-bis(2,3-epoxypropoxy)benzene, 1,3-bis(2,3-epoxypropoxy)benzene, 1,3-bis-(2,3-epoxybutoxy)benzene, 4,4'-bis(2,3 - epoxypropoxy)diphenyldimethylmethane, 1,3 - bis(2-hydroxy-3,4-epoxybutoxy)benzene, 1,2,3 - tri(2-hydroxy-3,4 - epoxypentoxy) naphthalene, the polymer obtained by reacting resorcinol with epichlorohydrin, the polymer prepared by reacting resorcinol with bis(2,3-epoxypropyl) ether, the polymer prepared by reacting sorbitol with epichlorohydrin, poly(allyl-2,3-epoxypropyl ether) and poly(2,3-epoxypropyl crotonate).

The most suitable epoxy-containing organic materials are those having a low degree of evaporation from the stabilized compositions, e. g. those having a boiling point above 300° C.

The preparation of many of the above-described epoxy-containing organic materials is described in the copending application of De Nie and Voorthuis, Serial No. 774,660, filed September 17, 1947, now abandoned, the copending application of Werner and Farenhorst, Serial No. 33,914, filed June 18, 1948, now U. S. Patent 2,467,171, and the copending application of Shokal and Winkler, Serial No. 34,346, filed July 21, 1948, now U. S. Patent 2,585,506.

The amount of each group of stabilizing agents to be employed in the process of the invention will vary over a considerable range depending upon the particular agents selected and the material to be stabilized. In most cases the amount of the first group of stabilizers, i. e. the diamides or diamide derivatives, will vary from 0.01% to 4% by weight of the material being stabilized with a preferred range varying from 0.5% to 2% by weight of the material stabilized. The amount of the second group of stabilizing agents, i. e. the epoxy-containing organic materials will generally vary from 0.01% to 5% by weight of material being stabilized with a preferred range varying from 0.05% to 3% by weight. The ratios of the two types of stabilizing agents to be employed to obtain the best results will vary considerably with the various agents and material to be employed and it is best to select such ratios for each individual case by a few routine determinations.

The stabilizing agents may be incorporated into the various composition by a variety of suitable methods. The agents may be added singly in any order or they may be added in admixture with one another. The agents may be added in a dissolved, suspended or pulverulent state to the desired high molecular weight organic materials which in turn may be in a dissolved, dispersed or solid state. If the material to be stabilized is a polymeric material the stabilizing agents may be introduced as solutions or dispersions in one or more of the reactants prior to the polymerization reaction, or they may be introduced subsequent to the polymerization reaction by any of the conventional methods for the incorporation of additives into plastic compositions, such as by mixing the resin and stabilizers in a masticator or on heated differential rolls.

Modifying agents, such as plasticizers, pigments and fillers may be added to the material to be stabilized before, at the same time as, or after the addition of the stabilizing agents.

It may be desirable in some cases, particularly when the material to be stabilized is a halogen-containing polymer prepared by the emulsion method, to add with the above-described stabilizing agents various acid neutralizing inorganic compounds, such as soda, sodium bicarbonate, sodium hydroxide, calcium carbonate, and magnesium oxide. The number of gram equivalents of the acid neutralizing inorganic compound to the gram molecules of the diamide should preferably range from 1.4 to 6.

The following examples are cited to illustrate the effectiveness of the process of the invention in stabilizing the above-described high molecular weight material against heat and light. It should be understood, however, that the examples are for the purpose of illustration and the invention is not to be regarded as being limited to any of the specific conditions cited therein. All percentages indicated in the examples are based on the weight of the material being stabilized.

*Example I*

Polyvinyl chloride was prepared in an aqueous emulsion containing sodium mersolate as the emulsifying agent and potassium persulfate as the catalyst at a pH of 8.0. The polymer was coagulated by the addition of a solvent, washed with water several times and subsequently dried.

Portions of the resulting polymer were mixed with 40% dioctyl phthalate and 0.12% sodium carbonate. Stabilizers were added to these mixtures as follows:

Sample I: no stabilizer.
Sample II: diphenyl thiourea (0.15%).
Sample III: 1,3 - bis(2,3 - epoxypropoxy)benzene 2.0%).
Sample IV: diphenyl thiourea (0.15%); 1,3-bis-(2,3-epoxypropoxy)benzene (2.0%).

The compositions were rolled into sheets of about 1.2 mm. thickness and the resulting sheets exposed to air at 160° C. Color of the various samples was determined periodically by means of the Lovibond tintometer.

The development of color in the various samples is illustrated by the accompanying graph. Line A indicates the development of color in Sample I, line B indicates the development of color in Sample II, line C indicates the development of color in Sample III, and line D indicates the development of color in Sample IV.

As can be seen from the graph the addition of diphenyl thiourea and 1,3-bis(2,3-epoxypropoxy)-benzene alone produces only a temporary resistance to color formation. After a short period there is a rather rapid increase in color formation in both compositions. The color formation is particularly rapid in the sample containing the diphenyl thiourea after about 40 minutes of heating.

When 1,3 - bis(2,3 - epoxypropoxy)benzene and diphenyl thiourea are utilized in combination, however, the development of color assumes an entirely different course. Instead of displaying a rapid increase in color formation after the first few minutes the composition containing these two agents showed continued resistance to discoloration. Even after 90 minutes of heating there is very little discorolation of the said composition. This extended resistance of the composition to color formation was surprising for from a consideration of the action of 1,3-bis(2,3-epoxypropoxy)benzene and diphenyl thiourea when employed alone (substantially the same after 75 minutes of heating) it would be expected that their combination would do little or nothing to increase the resistance of the composition to color formation.

*Example II*

A copolymer of 95% vinyl chloride and 5% vinyl acetate is mixed with 40% dioctyl phthalate, 0.15% dinaphthyl thiourea, 0.12% sodium carbonate, and 1.0% 4,4'-bis(2,3-epoxypropoxy)diphenyldimethylmethane. This composition is rolled into sheets and exposed to air at 160° C. After 90 minutes of heating the composition shows an increased resistance to color formation.

*Example III*

A chlorinated paraffin wax having a melting point of about 90–100° C. and a chlorine content of about 70% is mixed with 1.0 part of dinaphthylurea and 1.0 part of 4,4'-bis(2,3-epoxypropoxy)diphenyl ether. When heated at 180° C. the resulting composition shows an improved resistance to discoloration.

*Example IV*

Polyvinyl chloride is combined with 50 parts of dioctyl phthalate, 0.2 part of sodium carbonate, 0.15 part of a polymeric reaction product of bisphenol with epichlorohydrin (having a structure similar to the one illustrated in column 6), and 0.2 part of diphenyl thiourea. The composition is rolled into sheets and exposed to air at 160° C. The resulting composition shows excellent resistance to discoloration even after a prolonged period of heating at this temperature.

I claim as my invention:

1. As a composition of matter, polyvinyl chloride containing 0.15% by weight of diphenyl thiourea, 2.0% by weight of 1,3-bis(2,3-epoxypropoxy)benzene and 0.12% by weight of an acid-neutralizing inorganic compound dispersed therein, said composition being stabilized against the effects of heat and light.

2. As a composition of matter, polyvinyl chloride containing from 0.01% to 4% by weight of dinaphthyl thiourea and 0.01% to 5% by weight of 4,4'-bis(2,3-epoxypropoxy)diphenyldimethylmethane.

3. As a composition of matter, polyvinyl chloride containing from 0.01% to 4% by weight of a member of the group consisting of the diamide of carbonic acid, the diamide of acids derived from carbonic acid by replacing the central oxygen atom, and derivatives of the foregoing diamides wherein at least one of the hydrogen atoms on the amide nitrogen atoms has been replaced by an organic radical, and from 0.01% to 5% by weight of an epoxy-containing compound.

4. A halogen-containing polymer prepared by emulsion polymerization containing from 0.01% to 4% by weight of a member of the group consisting of the diamide of carbonic acid, the diamides of acids derived from carbonic acid by replacing the central oxygen atom, and derivatives of the foregoing diamides wherein at least one of the hydrogen atoms on the amide nitrogen atoms has been replaced by an organic radical, 1.4 to 6 gram equivalents per gram molecule of the diamide of an acid-neutralizing inorganic compound, and from 0.01% to 5% by weight of an epoxy-containing organic material.

5. As a composition of matter, a high molecular weight halogen-containing organic material containing a stabilizing additive consisting of a mixture of a member of the group consisting of the diamide of carbonic acid, the diamides of acids derived from carbonic acid by replacing the central oxygen atom, and derivatives of the foregoing diamides wherein at least one of the hydrogen atoms on the amide nitrogen atoms has been replaced by an organic radical, and an epoxy-containing organic material, the amount of the components of the additive being so proportioned as to render said high molecular weight organic material stable to heat.

6. As a composition of matter, a halogen-containing polymer containing from .01% to 4% by weight of a diamide of the group consisting of the diamide of carbonic acid, the diamides of acids derived from carbonic acid by replacing the central oxygen atom, and derivatives of the foregoing diamides wherein at least one of the hydrogen atoms on the amide nitrogen atom has been replaced by an organic radical, and .01% to 5% by weight of a polymeric epoxide formed by reacting a polyhydric alcohol with an excess of a halogen-containing epoxide in the presence of an alkaline catalyst.

7. As a composition of matter, a halogen-containing polymer containing from 0.01% to 4% by weight of a diamide of the group consisting of the diamide of carbonic acid, the diamides of acids derived from carbonic acid by replacing the central oxygen atom, and derivatives of the foregoing diamides wherein at least one of the hydrogen atoms on the amide nitrogen atom has been replaced by an organic radical, and .01% to 5% by weight of a polymer of an epoxy-containing monomer possessing at least one polymerizable aliphatic carbon-to-carbon multiple bond.

8. As a composition of matter, a halogen-containing polymer containing from 0.01% to 4% by weight of a diamide of the group consisting of the diamide of carbonic acid, the diamides of acids derived from carbonic acid by replacing the central oxygen atom, and derivatives of the foregoing diamides wherein at least one of the hydrogen atoms on the amide nitrogen atom has been replaced by an organic radical, and .01% to 5% by weight by a polyepoxy polyhydroxy polyether obtained by reacting a polyhydroxy alcohol with a polyepoxide.

9. As a composition of matter, a polymer of vinyl chloride containing from 0.01% to 4% by weight of a substituted thiourea wherein at least one of the hydrogen atoms on the amide nitrogen atoms has been replaced by an aromatic radical containing from 6 to 15 carbon atoms, and from 0.01% to 5% by weight of an epoxy-containing compound.

10. As a composition of matter, a high molecular weight halogen-containing organic material containing as a stabilizing additive a mixture of (1) a member of the group consisting of the diamide of carbonic acid, the diamides of acids derived from carbonic acid by replacing the central oxygen atom, and derivatives of the foregoing diamides wherein at least one of the hydrogen atoms on the amide nitrogen atoms has been replaced by an organic radical, and (2) an epoxy-containing organic material, the amount of the two components in the additive being so proportioned as to give the said material greater stability to heat than is possible by the separate addition of the said components.

11. A composition as defined in claim 4 wherein the diamide is a substituted thiourea wherein at least one of the hydrogen atoms on the amide nitrogen atoms has been replaced by an aromatic radical containing from 6 to 15 carbon atoms and the epoxy-containing organic material is a product obtained by reacting bisphenol with epichlorohydrin in an alkaline medium.

12. A composition as defined in claim 5 wherein the diamide is a substituted thiourea wherein at least one of the hydrogen atoms on the amide nitrogen atoms has been replaced by an aromatic radical containing from 6 to 15 carbon atoms.

13. A composition as defined in claim 6 wherein the diamide is a substituted thiourea wherein at least one of the hydrogen atoms on the amide nitrogen atoms has been replaced by an aromatic radical containing from 6 to 15 carbon atoms.

14. A composition of matter as defined in claim 10 wherein the epoxy-containing organic material is a product obtained by reacting bisphenol with epichlorohydrin in an alkaline medium.

15. As a composition of matter, a polymer of vinyl chloride containing from 0.01% to 4% by weight of a substituted thiourea wherein at least one of the hydrogen atoms on the amide nitrogen atoms has been replaced by an aromatic radical containing from 6 to 15 carbon atoms, and from 0.01% to 5% by weight of a product obtained by reacting bisphenol with epichlorohydrin in an alkaline medium.

HEINO TONNIS VOORTHUIS.

REFERENCES CITED

The following references are of record in the file of this patent:

UNITED STATES PATENTS

| Number | Name | Date |
| --- | --- | --- |
| 2,075,543 | Reed et al. | Mar. 30, 1937 |
| 2,365,400 | Fikentscher | Dec. 19, 1944 |